(No Model.) 2 Sheets—Sheet 1.

T. GRUBB.
BROADCAST SEED SOWER.

No. 388,485. Patented Aug. 28, 1888.

Witnesses:
R. H. Orwig.
M. P. Smith.

Inventor:
Thomas Grubb,
By Thomas G. Orwig, Atty.

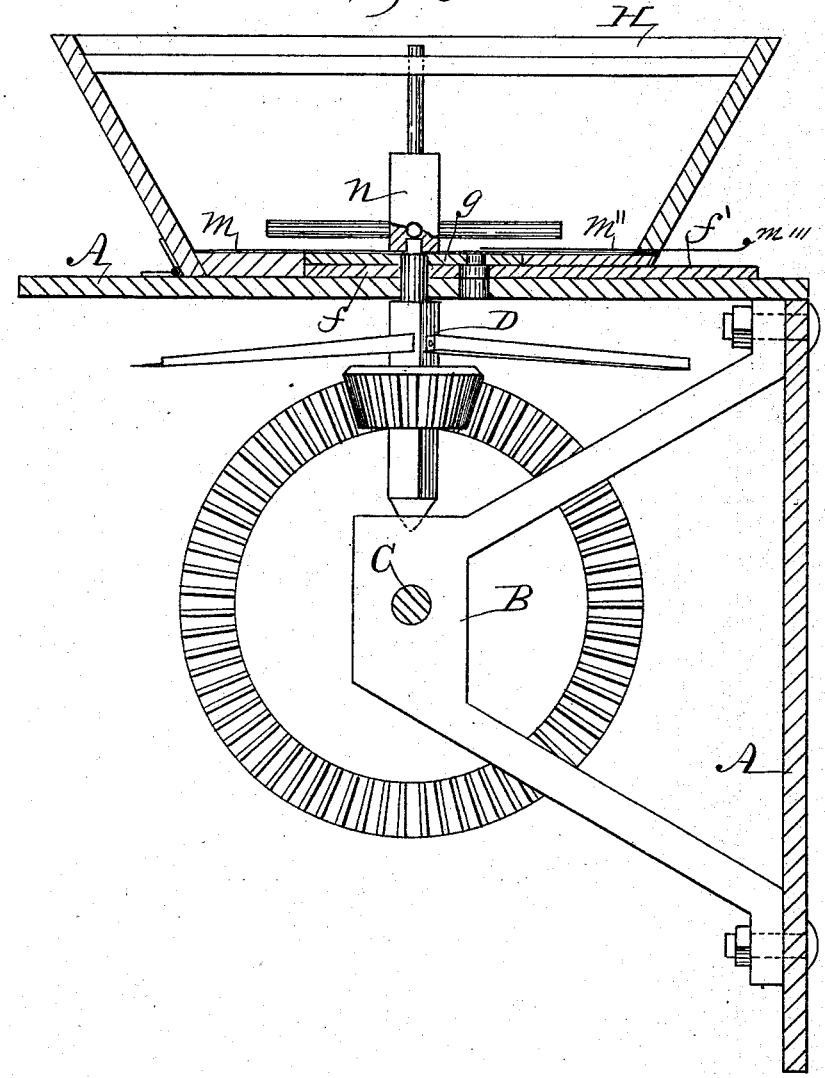

UNITED STATES PATENT OFFICE.

THOMAS GRUBB, OF BANCROFT, IOWA.

BROADCAST SEED-SOWER.

SPECIFICATION forming part of Letters Patent No. 388,485, dated August 28, 1888.

Application filed November 4, 1887. Serial No. 254,262. (No model.)

*To all whom it may concern:*

Be it known that I, THOMAS GRUBB, a citizen of the United States of America, and a resident of Bancroft, in the county of Kossuth and State of Iowa, have invented an Improved Broadcast Seed-Sower, of which the following is a specification.

My object is to improve the construction and operation of that style of machines that are adapted to be attached to a wagon to be operated by means of gearing connected with one of the traction-wheels.

My invention consists in the construction and combination of two disks with a hopper and seed-distributers, as hereinafter set forth, pointed out in my claims, and illustrated in the accompanying drawings, in which—

Figure 1:
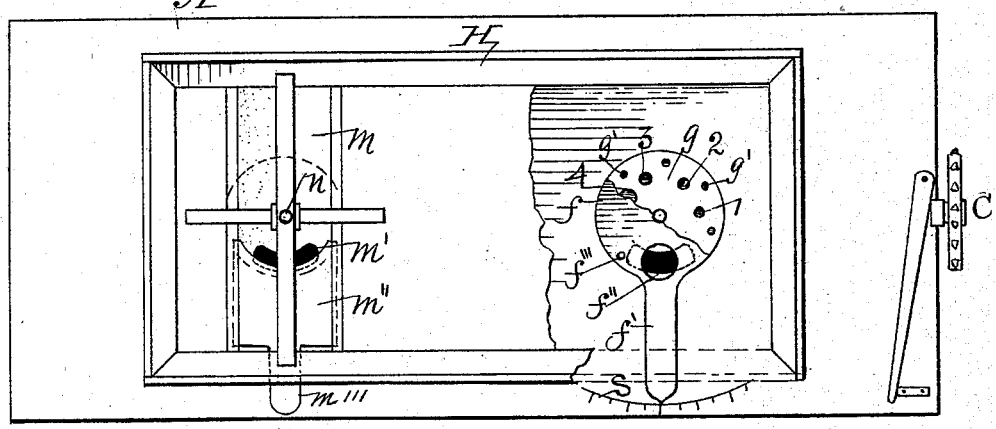
Figure 2:
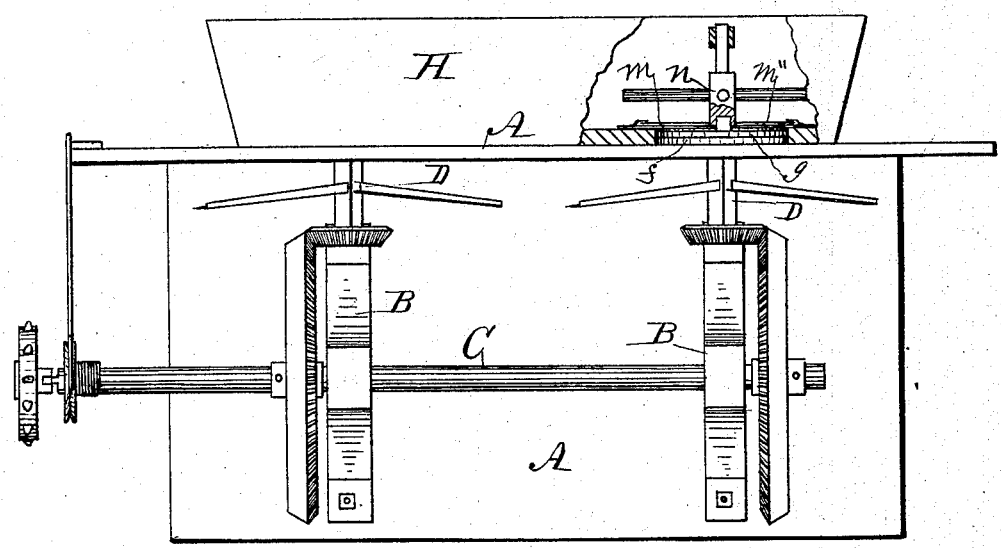

Figure 1 is a top view showing part of the hopper and part of one of the disks broken away. Fig. 2 is a rear view of the complete machine. Fig. 3 is a vertical sectional view.

A represents the frame or base, composed of two pieces of boards fixed together in a right-angled position.

B B are shaft-bearers in the form of metal brackets fixed to the rear side of the vertical part of the base.

C is a rotating shaft in the bearings B. It has a chain-wheel fixed to its projecting end, adapting it to be connected with a wagon-wheel in a common way by means of a drive-chain.

D D are rotating seed-distributers of common form, that rest in steps formed integral with the shaft-bearers B and extend up through bearings in the horizontal part of the base A. They are connected with the shaft C by means of bevel-gears, as clearly shown in Fig. 2, in such a manner that they will be simultaneously rotated in reverse ways. An adjustable disk, $f$, preferably made of metal, having a handle, $f'$, and a perforation in its center, is placed loosely over the top end of the shaft of each seed-distributer D in such a manner that it will rest upon the top of the flat surface of the base A.

$f''$ represents round holes through the disks $f$ and in line with the centers of the handles.

$f'''$ represents pins projecting vertically from the top surfaces of the disks.

$g$ $g$ are disks corresponding in size with the disks $f$, and provided with central holes, so they can be placed on top and in concentric positions with the disks $f$ and the rotating seed-distributers D. Each disk $g$ has a series and circle of perforations, $g'$, adapting it to be adjustably connected with the disk $f$ by allowing the pin $f'''$ to project into one of the perforations $g'$.

1 2 3 4 is a series of graduated seed-vents on a circle inside of the circle of perforations $g'$, through which the flow of different kinds and different qualities of seeds is allowed to pass at different times.

H is an elongated hopper hinged on top of the base in such a manner that it will in its normal condition rest flat upon the top surface thereof. Its fixed bottom has circular openings coinciding with the pivoted disks $f$ and $g$, as required, to admit said disks, as shown in Fig. 3.

$m$ represents sheet-metal covers fixed on the the top surface of the hopper-bottom to close said circular openings.

$m'$ represents curved slots in said metal covers in concentric position with the overlapping disks $f$ and $g$.

$m''$ represents slides with concave ends that conform with the curved slots $m'$.

$m'''$ represents integral handles that extend out through slots in the hopper in such a manner that the slides or cut-offs can be readily moved, as required, to close the slots $m'$, to stop the flow of seed from the hopper.

$n$ $n$ represent seed-stirrers in bearings fixed to the hinged hopper, to be carried by the hopper. Sockets in the bottoms of their shafts engage corresponding angular extensions on the top ends of the shafts of the seed-distributers D in such a manner that the stirrers and seed-distributers will rotate jointly when the machine is in operation.

$s$ $s$ represent scales formed or fixed on the top of the base A, at the ends of the handles $f'$ of the disks $f$, in such a manner that they will register the position of the holes $f''$ relative to the curved slots $m'$, as required, to regulate the throw of the seeds that drop upon the radial arms of the seed-distributers D.

To increase the throw of seed as required to cover a wider strip of ground and sow more area in one passage across a field, I simply turn the handles $f'$ inward, so the openings $f'''$ in the disks $f$ will let the seed drop upon the radial arms of the seed-distributers D at the right point of time to allow them to discharge most of the seed laterally relative to the machine, and not backward. Reverse motions of the same handles will cause the seed to drop nearer the center of the machine, so that it will be thrown forward in the line of advance and the area over which it is sown will consequently be narrowed. A simple practical means is thus provided for regulating the width of area to be sown at one passage across a field, and also a means for sowing different kinds of seeds and different quantities at different times with the same machine without using interchangeable parts.

I am aware that a disk having concentric circles of graduated seed-vents has been combined with a disk of smaller size in such a manner that they were eccentric to each other and that the small disk could be adjusted relative to the large disk by means of a handle to regulate the quantity of seed sown, and the two disks could be jointly adjusted relative to a seed-distributer and a slide or cut-off for the purpose of regulating the throw or cast of the seed sown.

I am also aware that two feed plates or disks have been combined with a hopper having two openings and two seed-distributers in such a manner that the disks could be adjusted relative to each other and the openings in the bottom of the hopper for the purpose of regulating the cast of the seed, but not the quantity.

I claim as my invention—

1. In a seed-sower, the combination of the disk $f$, having a handle, $f'$, a hole, $f'''$, and a pin, $f''''$, and a disk, $g$, having a series of pin-holes, $g'$, and a graduated series of seed-vents, 1 2 3 4, to operate in the manner set forth, for the purpose of regulating the quantity of seed sown and also the throw or cast of the seed.

2. The hopper H, having circular openings in its bottom, and covers $m$, having curved slots $m'$ fixed over said circular openings, the disks $f$, having perforations $f''$ and pins $f''''$, and the disks $g$, having pin-holes $g'$, and a graduated series of seed-vents, 1 2 3 4, constructed and combined to operate in the manner set forth, for the purpose of regulating the quantity of seed sown and also the throw or cast of the seed.

THOMAS GRUBB.

Witnesses:
F. J. BYRNE,
E. D. FULLER.